United States Patent
Lambardin et al.

(10) Patent No.: US 7,009,825 B2
(45) Date of Patent: Mar. 7, 2006

(54) EARTH LEAKAGE PROTECTION DEVICE AND ELECTRICAL SWITCHGEAR UNIT COMPRISING SUCH A DEVICE

(75) Inventors: Sylvie Lambardin, Chatenoy-le-Royal (FR); Simon Tian, Chalon/Saone (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 8 days.

(21) Appl. No.: 10/736,512

(22) Filed: Dec. 17, 2003

(65) Prior Publication Data

US 2004/0145841 A1 Jul. 29, 2004

(30) Foreign Application Priority Data

Jan. 24, 2003 (FR) .................................. 03 00806

(51) Int. Cl.
*H02H 3/00* (2006.01)
(52) U.S. Cl. ....................................................... 361/42
(58) Field of Classification Search ................. 361/42, 361/44, 45
See application file for complete search history.

(56) References Cited

U.S. PATENT DOCUMENTS 4,318,151 A * 3/1982 Balchin ........................ 361/45
4,370,692 A * 1/1983 Wellman et al. ............. 361/109
5,642,427 A * 6/1997 Katz et al. ..................... 381/97

FOREIGN PATENT DOCUMENTS

EP 0 039 280 A1 11/1981

* cited by examiner

*Primary Examiner*—Ronald Leja
(74) *Attorney, Agent, or Firm*—Steptoe & Johnson LLP

(57) ABSTRACT

The earth leakage protection device comprises an input designed to be connected to a measuring toroid, a comparator to compare a signal representative of an earth leakage current with a reference threshold, and a processing circuit to command a trip relay for opening main contacts when an earth leakage fault is detected. The device also comprises a signal rectifier receiving at least one signal representative of an earth leakage current, and a filter connected to the rectifier to supply a filtered rectified signal to said comparison means. The electrical switchgear unit comprises main conductors and contacts connected in series, the measuring toroid of the earth leakage current, the relay, and an earth leakage protection device with a matching filter connected to the toroid and to the trip relay.

4 Claims, 5 Drawing Sheets

EARTH LEAKAGE PROTECTION DEVICE AND ELECTRICAL SWITCHGEAR UNIT COMPRISING SUCH A DEVICE

BACKGROUND OF THE INVENTION

The invention relates to an earth leakage protection device comprising an input designed to be connected to a measuring toroid of an earth leakage current, comparison means for comparing a signal representative of an earth leakage current with a reference threshold, and processing means to command a trip relay for opening main contacts when an earth leakage fault is detected. The invention also relates to an electrical switchgear unit comprising main conductors and contacts connected in series, a measuring toroid of an earth leakage current surrounding the main conductors, a trip relay for opening said main contacts, and an earth leakage protection device connected to the toroid and to the trip relay.

STATE OF THE ART

Known earth leakage protection devices, like those represented in FIGS. 1 and 2, generally comprise a measuring toroid 1 surrounding primary conductors 2 of a line to be protected. These devices also comprise an electronic circuit 3 connected to a secondary winding 4 of said toroid to process control of a trip relay 5 for opening main contacts.

Generally, earth leakage protection devices operate by peak detection of the signal. Thus, in the example of FIG. 1, an amplifier 6 connected to the winding 4 of the toroid 1 receives a signal 7 representative of an earth leakage fault current occurring in a circuit of the primary conductors. On output from the amplifier, an amplified signal 8 is applied to a comparator 9. This comparator may be single or double as represented in FIG. 1. If the signal is an AC signal, a first part of the comparator 9A compares the positive half-wave with a first reference and a second part 9B compares the negative half-wave with a second reference of opposite polarity to that of the first reference. The output of the comparator is applied to the input of a control circuit 10 to control tripping, notably according to the time during which the references are exceeded in the comparators. However, with peak detection of the signal, the tripping thresholds are very different depending on the shape of the signal. Since the tripping thresholds are expressed in rms values, large differences can occur. It is possible to recenter the references of the comparators so as to pass a maximum of signal shapes, but with this solution the detected pulse shapes lead to too low tripping thresholds.

In the device represented in FIG. 2, detection is performed in rms values enabling the problems of the peak detection embodiment to be partially overcome. In this case, a module 11 connected between the amplifier 6 and comparator 9 enables a signal 12 representative of an rms value of the signal 8 on output of the amplifier to be supplied to the comparator 9. This system enables the problems connected with the pulse current shapes to be overcome but gives rise to detection errors when the primary fault current comprises a DC component. This DC component is present when the primary signal is a rectified signal or has a single half-wave, or when a direct current is superposed on an alternating or rectified current or a single half-wave current.

These detection problems are notably due to the fact that the toroid 1 lets a variable signal pass but blocks the DC components. Detection of an rms value of such a modified signal then adversely affects the detection precision. Thus faults with a DC component are under-detected which has the effect of increasing the tripping thresholds.

Thus, known devices operating in peak value and rms values produce too large threshold differences to be able to pass very different signal shapes in particular pulse shapes and shapes containing a DC component.

OBJECT OF THE INVENTION

The object of the invention is to achieve an improved earth leakage protection device able to have a high tripping precision with several types of earth leakage fault current shapes.

An earth leakage protection device according to the invention comprises rectifying means receiving at least one signal representative of an earth leakage current, filtering means connected to the rectifying means to filter a rectified signal supplied by the rectifying means and to supply a filtered rectified signal to said comparison means.

Advantageously, the filtering means comprise a low-pass filter having a cut-off frequency comprised between 2 and 4 times the fundamental frequency of an electrical power system.

In a preferred embodiment, the device comprises an integrated circuit comprising:
  an amplifier receiving input signals,
  a signal rectifier connected on output of the amplifier,
  at least a first part of the filtering means connected on output of the amplifier and comprising a filtering output,
  a comparator connected to said first part of the filtering means,
  control means comprising a time delay device to monitor tripping and non-tripping times connected on output of said comparator, and
  a tripping control output connected on output of the control means.

In a particular embodiment, the filtering means comprise a first internal part with a resistive element arranged in an integrated circuit and a second external part with a capacitive element arranged outside said integrated circuit and connected to the internal part by means of a filtering output.

Preferably, the filtering means comprise a first internal part comprising two buffer circuits to command a current mirror designed to reference a filtering signal to a power supply line or a reference line.

An electrical switchgear unit according to an embodiment of the invention comprises main conductors and contacts connected in series, a measuring toroid of an earth leakage current surrounding the main conductors, a trip relay for opening said main contacts and an earth leakage protection device as defined above connected to the measuring toroid and to the trip relay.

BRIEF DESCRIPTION OF THE DRAWINGS

Other advantages and features will become more clearly apparent from the following description of particular embodiments of the invention, given as non-restrictive examples only and represented in the accompanying drawings in which.

DETAILED DESCRIPTION OF PREFERRED EMBODIMENTS

Figure 1:
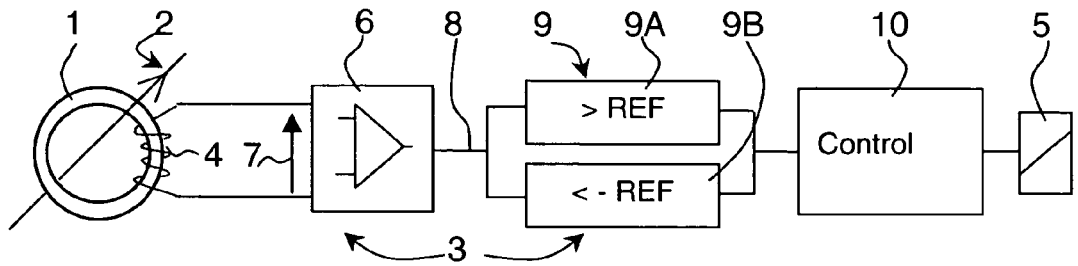
FIGS. 1 and 2 represent diagrams of state-of-the-art earth leakage protection devices.
Figure 2:
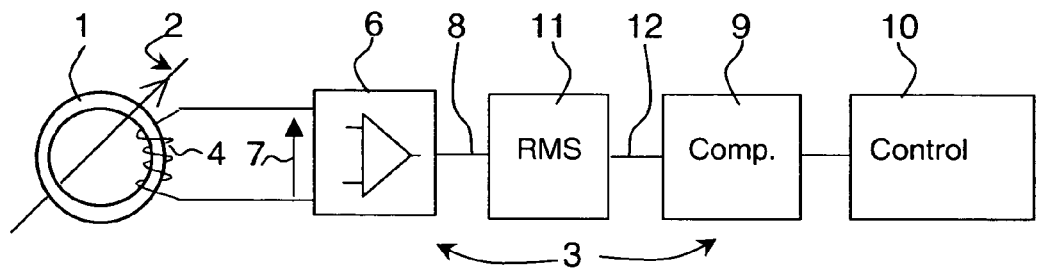
Figure 3:
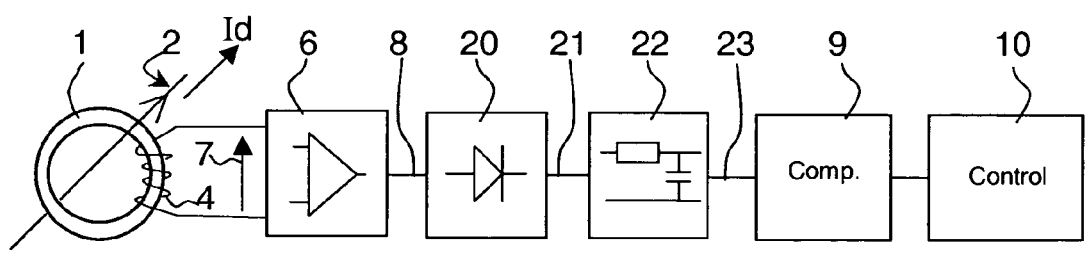
FIG. 3 represents a diagram of an earth leakage protection device according to a first embodiment of the invention.

An earth leakage protection device according to an embodiment of the invention represented in FIG. 3 enables a great tripping threshold precision to be had for several types of earth leakage current curves. The device comprises a toroid 1 surrounding main conductors 2 wherein an earth leakage fault current Id can flow. A secondary winding 4 of the toroid is connected to an amplifier 6 to supply a signal 7 representative of the earth leakage current Id. The amplifier 6 amplifies the input signal and supplies an amplified signal 8 to an electronic rectifier 20. The signal 8 is rectified by the rectifier 20 to supply a rectified signal to a filter 22 matching a set of defined fault signal curves and to the frequency of an electrical power distribution system to which the main conductors are connected. The filter 22 supplies a filtered signal 23 to a comparison circuit 9 which compares the signal 23 with a reference and supplies a detection signal to the control circuit 10.

Preferably, the filter 22 is a low-pass filter the cut-off frequency whereof is comprised between 2 and 4 times the fundamental frequency of an electrical power system. Advantageously, the cut-off frequency is comprised between 100 Hz and 200 Hz for a 50 Hz power system and between 120 Hz and 240 Hz for a 60 Hz power system.

Figure 4A:
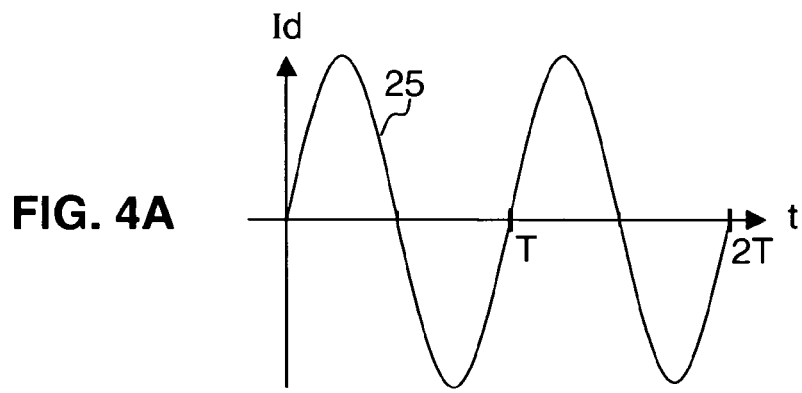
FIGS. 4A, 4B, 4C, 4D and 4E illustrate curves able to be used in devices according to the invention.
Figure 4B:
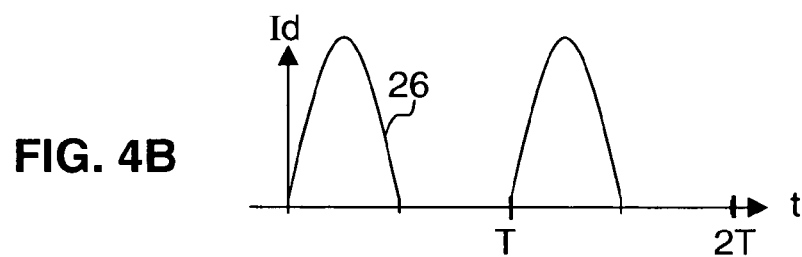
Figure 4C:
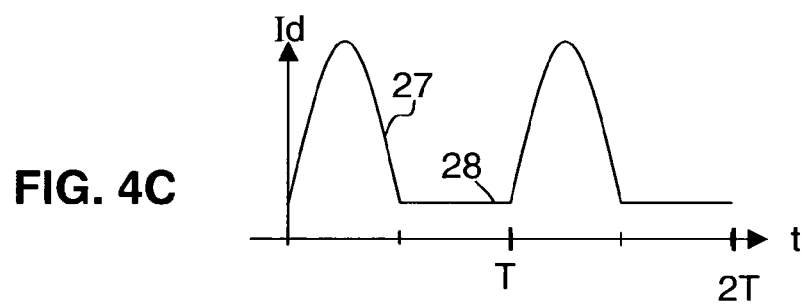

FIGS. 4A, 4B, 4C, 4D and 4E illustrate curves able to be used in devices according to the invention with good detection threshold precisions. In FIG. 4A, a curve 25 is a sinusoid curve acting as reference where the precision must be the highest. A period T of the curve corresponds to the frequency of the electrical distribution system. In FIG. 4B, a curve 26 is a rectified half-wave sinusoid curve. In FIG. 4C, a curve 27 is a rectified half-wave sinusoid curve whereupon an additional DC component 28 is added. The curves 26, 27 present DC components due to their single polarity. These curves cause large detection errors in devices where the toroid is associated to an rms value module.

Figure 4D:
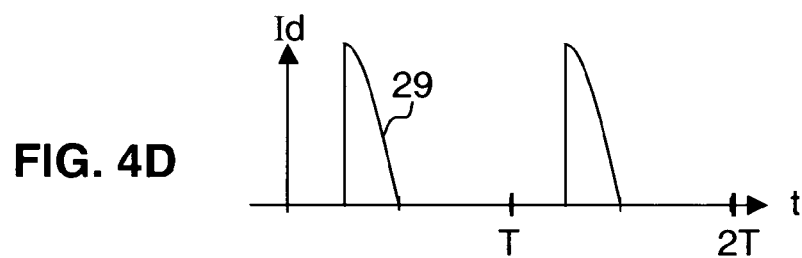
Figure 4E:
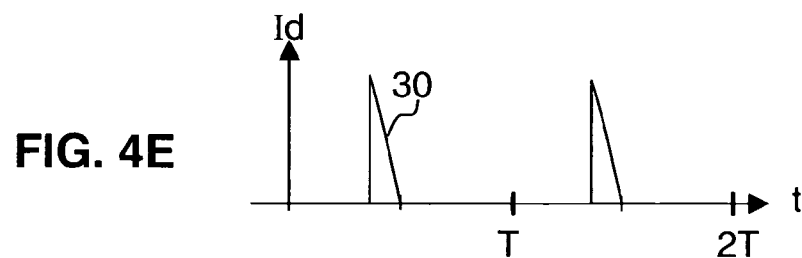

In FIG. 4D, a curve 29 is a curve of a portion of rectified single half-wave or truncated at 90 degrees sinusoid. In FIG. 4E, a curve 30 is a curve of a rectified portion of quarter-wave or truncated at 135 degrees sinusoid. The curves 29 and 30 present large peaks. These curves cause large detection errors in peak detection devices.

In a device according to embodiments of the invention, associating a rectifier and a suitable filter enables the DC component to be taken into account and the pulse peaks to be attenuated for a large number of curves.

Figure 5:
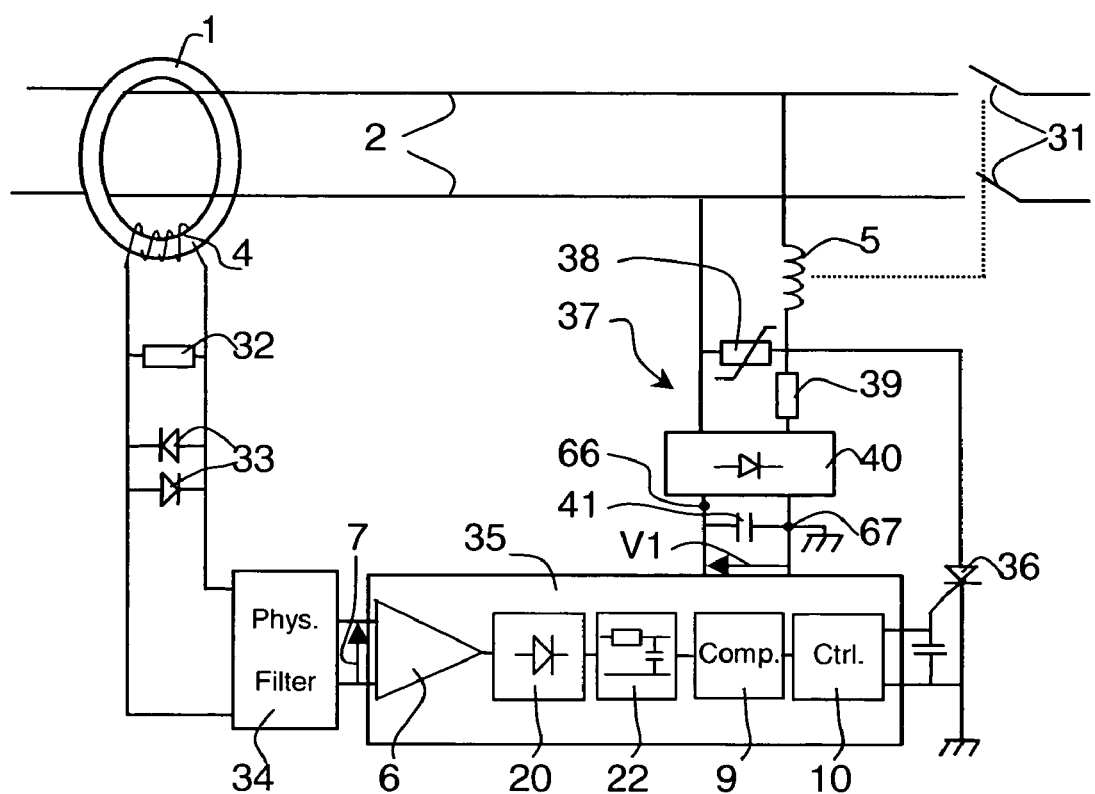
FIG. 5 represents a diagram of a switchgear unit comprising an earth leakage protection device according to an embodiment of the invention.

FIG. 5 represents a diagram of a switchgear unit comprising an earth leakage protection device according to an embodiment of the invention. The toroid 1 surrounds main conductors 2 connected in series with main contacts 31. The secondary winding 4 of the toroid is connected to a charging resistor 32 and to protection diodes connected head-to-tail. The AC signal on output of the winding is also applied to an optional physiological filter 34. This filter has a frequency response close to that of the human body. On output of the filter 34 or directly from the toroid, a signal 7 is applied to the input of a processing circuit 35. This processing circuit comprises the amplifier 6 receiving the signal 7, the rectifier 20 connected to the amplifier, the matching filter 22 connected to the rectifier, the comparator 9 connected to the filter 22, and the control circuit 10 connected to the comparator 9. The control circuit 10 has an output to command a thyristor 36 and supply the trip relay 5. The circuit 35 can notably be an integrated circuit. An electrical power supply connected to the main conductors 2 supplies power to the electronic circuitry. Power supply is performed via the relay 5 which also performs a voltage drop. A variable resistor 38 connected down-line from the coil of the relay 5 protects the electronic circuitry against voltage surges. Then a resistor 39, a rectifier 40, and a capacitor 41 respectively enable the voltage to be reduced, the alternating current to be rectified and a supply voltage V1 of the electronic circuit 35 to be filtered.

Figure 6:
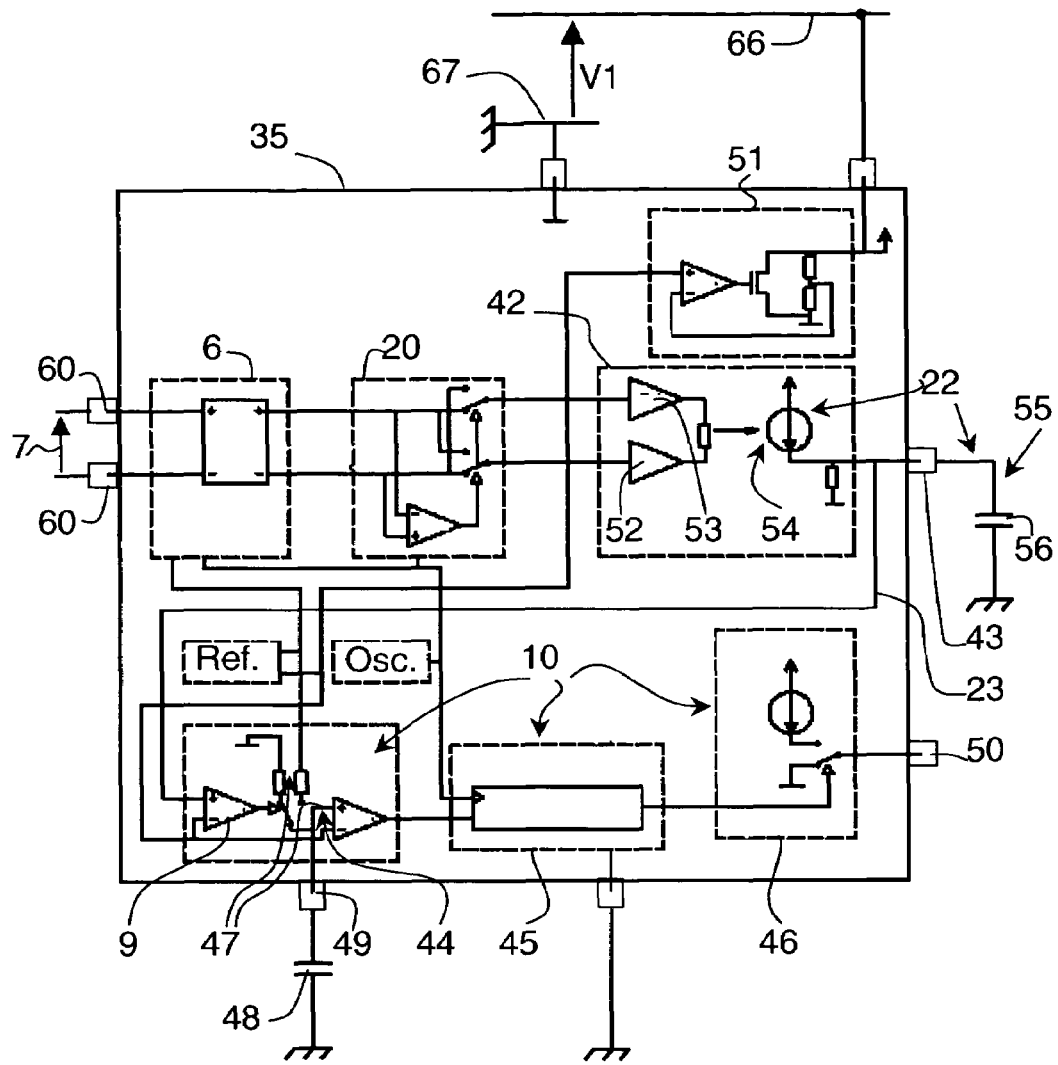
FIG. 6 represents a diagram of a circuit used in an earth leakage protection device according to one embodiment of the invention.

FIG. 6 represents a detailed diagram of a circuit 35 used in an earth leakage protection device according to an embodiment of the invention. The circuit 35 can be an integrated circuit comprising an amplifier 6 receiving input signals 7, a signal rectifier 20 connected on output of the amplifier 6, at least a first part 42 of the matching filter 22 connected on output of the rectifier and comprising a filtering output 43, a comparator 9 connected to said first part of the matching filter, and processing circuits 44, 45, and 46. Among the processing circuits, a time delay device 44 comprises a resistive part and a comparator internal to the circuit 35 and a capacitive part such as a capacitor 48 external to the circuit 35 connected by an output 49. A programmable circuit 45 connected to the time delay circuit enables the tripping and non-tripping time to be processed and controls an output circuit 46 connected to an output 50.

The circuit 35 also comprises a power supply regulator 51 to supply a regulated power supply to the different circuits internal to the circuit 35. The first part 42 of the matching filter 22 comprises buffer amplifiers 52 and 53, and a current mirror to reference the filtering signal 23 to a power supply line 66 or a reference line 67 of the power supply. The matching filter 22 comprises a second external capacitive part 55 represented by a capacitor 56 connected to the filtering output 43. The value of the capacitor enables the cut-off frequency of the filter to be adapted according to the frequency of the power system or to the types of fault current curves to be detected.

Figure 7:
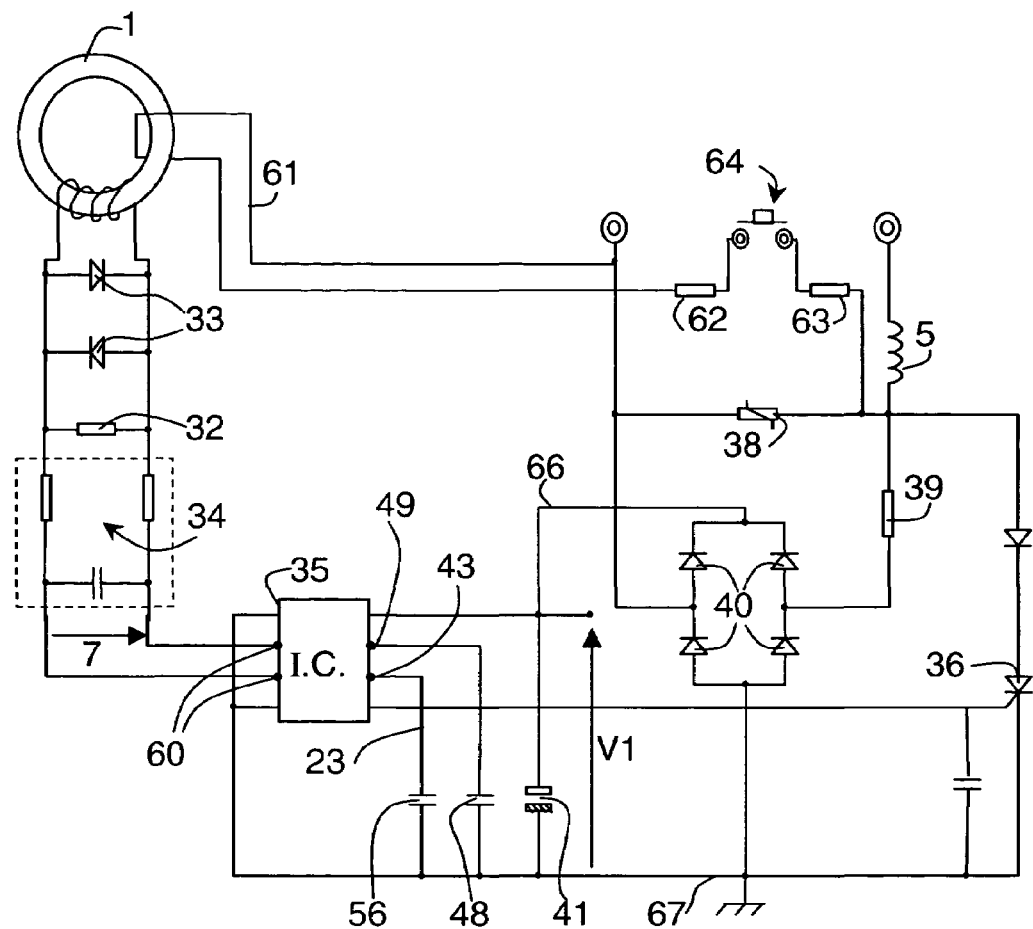
FIG. 7 represents a diagram of an earth leakage protection device according to a second embodiment of the invention.

FIG. 7 represents a diagram of an earth leakage protection device according to an embodiment with integrated circuit. The integrated circuit 35 comprises two inputs to receive the signal 7, a filtering output 43 to which the filtering capacitor 56 is connected, and an output 49 to which the time delay capacitor 48 is connected.

In this diagram, the earth leakage protection device comprises a test circuit comprising a conductor 61 running in a loop inside the toroid and connected in series with current limiting resistors 62 and 63, and a push-button 64. The assembly is connected like the power supply circuit 37 down-line from the trip relay 5.

In the embodiments described above the matching filter is represented as a first order filter of resistor-capacitor type but other types of filter can be suitable in particular second order filters or digital filters.

The invention claimed is:

1. An earth leakage protection device comprising:
   an input for connecting to a measuring toroid of an earth leakage current,
   comparison means for comparing a signal representative of said earth leakage current with a reference threshold,
   processing means to command a trip relay for opening main contacts when an earth leakage fault is detected,
   rectifying means for receiving at least one signal representative of an earth leakage current, and
   filtering means comprising a first internal part that comprises two buffer circuits to command a current mirror that references a filtering signal to a power supply line or a reference line, with a resistive element arranged in an integrated circuit, and a second external part with a capacitive element arranged outside said integrated circuit and connected to the internal part by a filtering output, said filtering means, connected to the rectifying means, for:

filtering a rectified signal supplied by the rectifying means; and supplying a filtered rectified signal to said comparison means.

2. The earth leakage protection device of claim 1 wherein the filtering means comprises a low-pass filter having a cut-off frequency between 2 and 4 times the fundamental frequency of an electrical power system.

3. The earth leakage protection device of claim 1, further comprising the integrated circuit comprising:

an amplifier receiving input signals, the rectifying means connected to an output of the amplifier, at least a first part of the filtering means connected to an output of the rectifying means and comprising a filtering output, a comparator connected to said first part of the filtering means, control means comprising a time delay device to monitor tripping and non-tripping times connected to an output of said comparator, and a tripping control output connected to an output of the processing means.

4. An electrical switchgear unit comprising main conductors and contacts connected in series, a measuring toroid of an earth leakage current surrounding the main conductors, and a trip relay for opening said main contacts, and an earth leakage trip device according to claim 1 connected to the measuring toroid and to the trip relay.

* * * * *